United States Patent
Jung et al.

(10) Patent No.: US 8,778,282 B2
(45) Date of Patent: Jul. 15, 2014

(54) MICROFLUIDIC DEVICE HAVING MICROVALVE

(75) Inventors: Won-jong Jung, Seongnam-si (KR); Chin-sung Park, Yongin-si (KR); Kak Namkoong, Seoul (KR); Joon-ho Kim, Seongnam-si (KR); Hyung-sok Yeo, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 322 days.

(21) Appl. No.: 12/957,900

(22) Filed: Dec. 1, 2010

(65) Prior Publication Data
US 2011/0305607 A1 Dec. 15, 2011

(30) Foreign Application Priority Data
Jun. 15, 2010 (KR) .................. 10-2010-0056758

(51) Int. Cl.
*F16K 1/00* (2006.01)
*B01L 99/00* (2010.01)
*F16K 99/00* (2006.01)

(52) U.S. Cl.
CPC .................. *F16K 99/0026* (2013.01)
USPC ............ 422/537; 422/502; 422/503; 251/334

(58) Field of Classification Search
CPC .. F16K 1/42; F16K 99/0026; B01L 3/502738
USPC ........................... 422/537, 502, 503; 251/334
See application file for complete search history.

(56) References Cited

U.S. PATENT DOCUMENTS

| | | | |
|---|---|---|---|
| 4,852,851 A | 8/1989 | Webster | |
| 5,593,130 A | 1/1997 | Hansson et al. | |
| 6,408,878 B2 | 6/2002 | Unger et al. | |
| 7,445,926 B2 | 11/2008 | Mathies et al. | |
| 7,494,555 B2 | 2/2009 | Unger et al. | |
| 7,507,380 B2 | 3/2009 | Chang et al. | |
| 2001/0029983 A1* | 10/2001 | Unger et al. | 137/597 |
| 2004/0115068 A1* | 6/2004 | Hansen et al. | 417/379 |
| 2004/0209354 A1* | 10/2004 | Mathies et al. | 435/287.2 |

FOREIGN PATENT DOCUMENTS

| | | |
|---|---|---|
| JP | 2001-304440 | 10/2001 |
| KR | 10-2007-0061109 A | 6/2007 |
| KR | 1020080059426 A | 6/2008 |
| KR | 1020100028526 A | 3/2010 |

* cited by examiner

*Primary Examiner* — Paul Hyun
(74) *Attorney, Agent, or Firm* — Leydig, Voit & Mayer, Ltd.

(57) ABSTRACT

A microfluidic device including a microvalve includes a first substrate, a second substrate facing the first substrate, an elastic film between the first and second substrates, a microfluidic channel on the second substrate, a valve seat of the second substrate protruding in the microfluidic channel, and a fine structure on a surface of the elastic film, facing the valve seat and which contacts the valve seat when the microvalve is operated.

22 Claims, 7 Drawing Sheets

MICROFLUIDIC DEVICE HAVING MICROVALVE

CROSS-REFERENCE TO RELATED APPLICATIONS

This application claims priority to Korean Patent Application No. 10-2010-0056758, filed on Jun. 15, 2010, and all the benefits accruing therefrom under 35 U.S.C. §119, the disclosure of which is incorporated herein in its entirety by reference.

BACKGROUND

1. Field

Provided are microfluidic devices having a microvalve, and more particularly, microfluidic devices including microstructures on a surface of an elastic film in a microvalve.

2. Description of the Related Art

An analysis of samples related to clinics or the environment is achieved through a biochemical, chemical, or mechanical treatment process. Recently, the development of techniques for diagnosing or monitoring a biological sample has drawn a significant interest. The application of a molecular diagnosis method based on nucleic acid has significantly increased recently in the fields of diagnosing an infectious disease or cancer, pharmacogenomics, or developing a new medicine due to its high accuracy and sensitivity. A microfluidic device is widely used for simply and precisely analyzing a sample according to various purposes. The microfluidic device includes a plurality of sample inlets, sample outlets, microfluidic channels, and reaction chambers, and thus, simply performs various tests on a single sample. Accordingly, the microfluidic device uses various kinds of sensors and platforms for amplifying/diagnosing a bio-sample, and developing a new medicine.

The microfluidic device may further include fine microvalves and micropumps so that a sample and a reagent may be correctly supplied to target positions in the microfluidic device. A microvalve is disposed in a microfluidic channel in the microfluidic device. The microvalve may be formed by disposing an elastic film and a valve seat in the microfluidic channel of the microfluidic device. In such a microvalve structure, generally, the microvalve is closed while the elastic film contacts the valve seat, and accordingly, a sample may not pass the microfluidic channel. Conversely, while the elastic film is separated from the valve seat, the microvalve is opened, and thus, a sample may pass the microfluidic channel.

However, in the case of a conventional microvalve, normally, the elastic film and the valve seat contact each other when the microvalve is not in operation. Thus, after a lapse of time, the elastic film may stick to the valve seat. In this case, the opening and closing operations of the microvalve may not be smoothly performed when the microvalve is finally operated. In order to prevent stiction or sticking between the elastic film and the valve sheet when the microvalve is finally operated, the manufacturing process of the microfluidic device may be complicated.

SUMMARY

Provided are microfluidic devices that prevent stiction between an elastic film and a valve sheet since a microstructure is on a surface of the elastic film in a microvalve.

Provided is a microfluidic device including a first substrate and a second substrate, which face each other, an elastic film between the first and second substrates, a microfluidic channel on the second substrate, a valve seat protruding into the microfluidic channel of the second substrate, an empty space or cavity on a surface of the first substrate facing the second substrate and corresponding to the valve seat, and a fine pattern on a surface of the elastic film facing and corresponding to the valve seat.

In this structure, when a pneumatic pressure is supplied through the empty space, an upper surface of the valve seat and the fine pattern of the elastic film may contact each other, and while a pneumatic pressure is not supplied through the empty space, there is a gap between the upper surface of the valve seat and the fine pattern of the elastic film.

The fine pattern of the elastic film may include a concave groove extending from the surface of the elastic film facing the valve seat.

A bottom surface of the concave groove may have a shape corresponding to a surface shape of the valve seat when the bottom surface of the concave groove is viewed in a first cross-sectional direction.

The bottom surface of the concave groove may have a flat shape when the bottom surface of the concave groove is viewed in the first cross-sectional direction.

The concave groove may have a width greater than that of the valve seat, so that the valve seat enters into the concave groove when viewed in the first cross-section direction.

End portions of the concave groove may contact end portions of the valve seat, and a distance between the concave groove and the valve seat may increase towards the center of the concave groove, when the concave groove is viewed in a second cross-sectional direction which is a perpendicular to the first cross-sectional direction.

The concave groove may have a round or semi-circular shape when the concave groove is viewed in the second cross-sectional direction.

The fine pattern of the elastic film may include a concave groove extending from the surface of the elastic film, and a protrusion portion extending from the bottom surface of the concave groove and corresponding to the valve seat.

The concave groove may have a width substantially equal to that of the empty space in the first substrate.

The protrusion portion may have a triangular shape.

The protrusion portion may have a height smaller than a depth of the concave groove.

The fine pattern of the elastic film may include a concave groove extending from the surface of the elastic film, and an embossed fine lattice pattern protruding from the bottom surface of the concave groove and corresponding to the valve seat.

The fine lattice pattern may have an array structure in which a plurality of parallel bars protrude from the bottom surface of the concave groove, or may have an embossed mesh structure.

The fine lattice pattern may have a height smaller than a depth of the concave groove.

The fine pattern of the elastic film may include an engraved fine lattice pattern on the surface of the elastic film facing and corresponding to the valve seat.

The fine lattice pattern may have an array structure in which a plurality of bars are engraved from the surface of the elastic film, or may have an engraved mesh structure.

The surface of the fine lattice pattern may be closer to the valve seat than the surface of the elastic film.

Provided is a microfluidic device including a first substrate and a second substrates, which face each other, an elastic film between the first and second substrates, a microfluidic channel on a surface of the second substrate facing the first substrate, a fine pattern protruding from a surface of the elastic film towards a bottom surface of the microfluidic channel of the second substrate, and an empty space or cavity on a surface of the first substrate facing the second substrate and corresponding to the fine pattern.

In this structure, when a pneumatic pressure is supplied through the empty space, the bottom surface of the microfluidic channel may contact the fine pattern of the elastic film, and while a pneumatic pressure is not supplied through the empty space, there is a gap between the bottom surface of the microfluidic channel and the fine pattern of the elastic film.

The fine pattern of the elastic film may have a height smaller than that of the microfluidic channel.

The microfluidic channel may have a height substantially equal to a distance between the surface of the elastic film and the surface of the second surface.

The fine pattern of the elastic film may include a protrusion portion having a triangular shape protruding from the surface of the elastic film.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
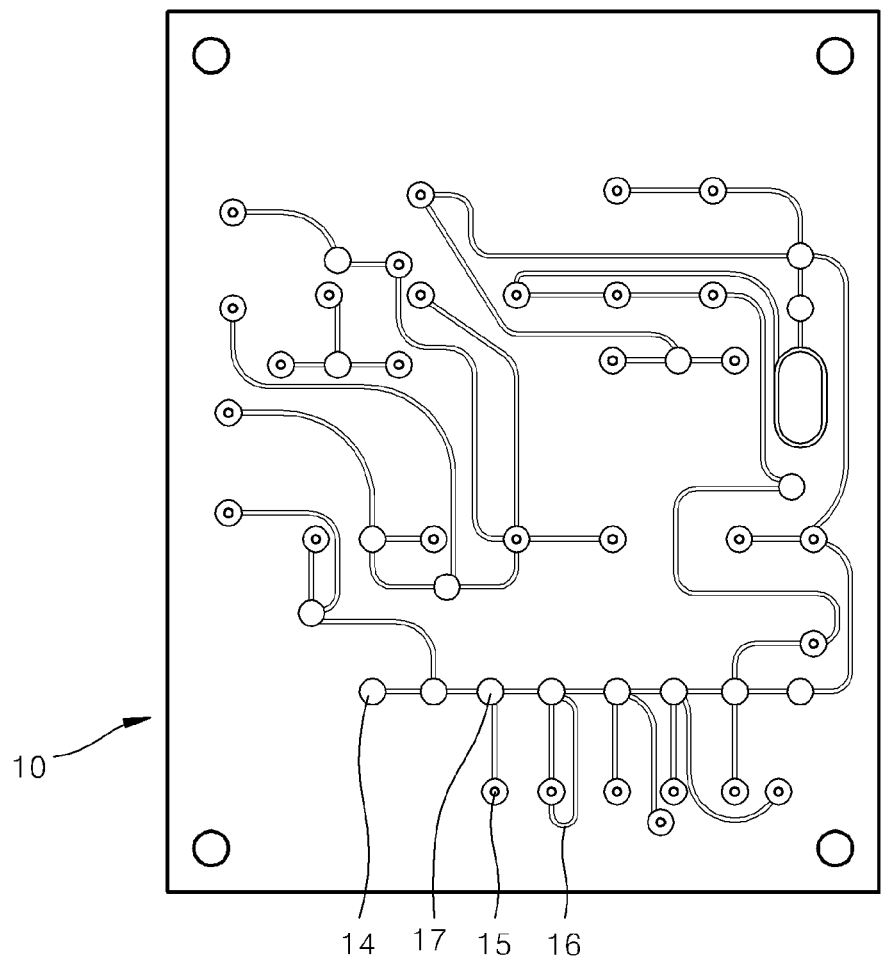
FIG. 1 is a schematic plan view of an embodiment of a microfluidic device, according to the present invention.

Reference will now be made in detail to embodiments, examples of which are illustrated in the accompanying drawings, wherein like reference numerals refer to like elements throughout. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the thicknesses of layers and regions are exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically, fluidly and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "upper" or "above" relative to the other elements or features. Thus, the exemplary term "lower" and "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

FIG. 1 is a schematic plan view of an embodiment of a microfluidic device 10, according to the present invention. Referring to FIG. 1, the microfluidic device 10 may include a plurality of a hole 15 through which a sample, a reagent, or air, enters and/or exits the microfluidic device 10, a plurality of a reaction chamber 14 in which a chemical and/or biological reaction takes place, a plurality of a microfluidic channel 16 which are paths for moving the sample within the microfluidic device 10, and a plurality of a microvalve 17 for accurately controlling the flow of the sample to target positions, which are located on, for example, a thin and transparent substrate. In FIG. 1, one reference number for each of the reaction chamber 14, the hole 15, the microfluidic channel 16, and the microvalve 17 is shown for convenience although there are a plurality of reaction chambers 14, a plurality of holes 15, a plurality of microfluidic channels 16, and a plurality of microvalves 17 included in the microfluidic device 10. Also, the locations of the reaction chambers 14, the holes 15, the microfluidic channels 16, and the microvalves 17 in the microfluidic device 10 in FIG. 1 are exemplary. The numbers and dispositions of the reaction chambers 14, the holes 15, the microfluidic channels 16, and the microvalves 17 may vary according to the usage of the microfluidic device 10 and design.

The microvalves 17 may be within the microfluidic channels 16, and function to pass or block a sample within the microfluidic channels 16. The microvalves 17 may include a thin elastic film.

Figure 2:
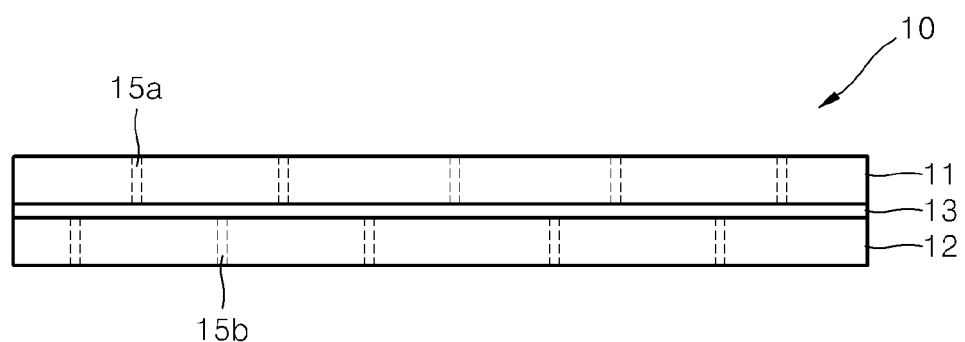
FIG. 2 is a schematic cross-sectional view of the microfluidic device of FIG. 1.

FIG. 2 is a schematic cross-sectional view of the microfluidic device 10 of FIG. 1, in which the microvalves 17 are disposed in the microfluidic channels 16. Referring to FIG. 2, the microfluidic device 10 may include a first substrate 11, a second substrate 12, and an elastic film 13 between the first and second substrates 11 and 12. The first substrate 11 may include a plurality of a first hole 15a, and the second substrate 12 may include a plurality of a second hole 15b. The first holes 15a may be pneumatic holes for supplying a pneumatic pressure to push the elastic film 13, and the second holes 15b may be fluid holes for supplying a fluid such as a sample. Although only the first and second holes 15a and 15b are shown for convenience in FIG. 2, the reaction chambers 14 and the microfluidic channels 16 may be individually on surfaces of each of the first and second substrates 11 and 12 facing each other. Here, the elastic film 13 may be include, for example, a polymer such as polydimethylsiloxane ("PDMS"). The first and second substrates 11 and 12 may include, for example, a transparent material such as glass or plastic.

Figure 3:
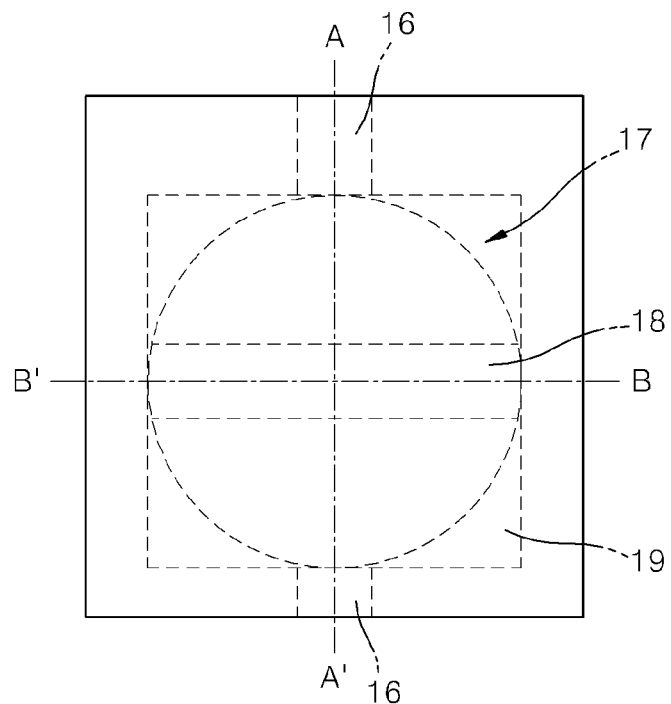
FIG. 3 is a plan view of an embodiment of a region of a microvalve in the microfluidic device, according to the present invention.

FIG. 3 is a plan view of a region of a microvalve 17 in the microfluidic device 10, according to the illustrated embodiment of the present invention. The configuration of the microvalve 17 is indicated by dotted lines in FIG. 3. Referring to FIG. 3, a valve seat 18 is extended completely across the microfluidic channel 16. The microfluidic channel 16 may have a width greater than other areas of the microfluidic device 10 on which the valve seat 18 is on, in a plan view of the microfluidic device 10, so that the microvalve 17 may smoothly operate. In one embodiment, for example, the microfluidic channel 16 and the valve seat 18 may be within or on the second substrate 12.

Although not shown in FIG. 3, the elastic film 13 is disposed above the valve seat 18. In the first substrate 11 disposed on the elastic film 13, an empty space 19 (FIG. 4A and 4B) may be defined in a region of the first substrate 11 corresponding to the location of the valve seat 18. The empty space 19 is where a pneumatic pressure is supplied to push the elastic film 13 with a sufficient force towards the valve seat 18 when the microvalve 17 performs a closing operation. The empty space 19 is a void or cavity in the first substrate 10, such that a pneumatic pressure can be created by introducing a material or substance into the void or cavity. As used herein, the term "corresponding" is used to indicate being substantially similar in dimension, quantity or positional placement with respect to another element.

Figure 4A:
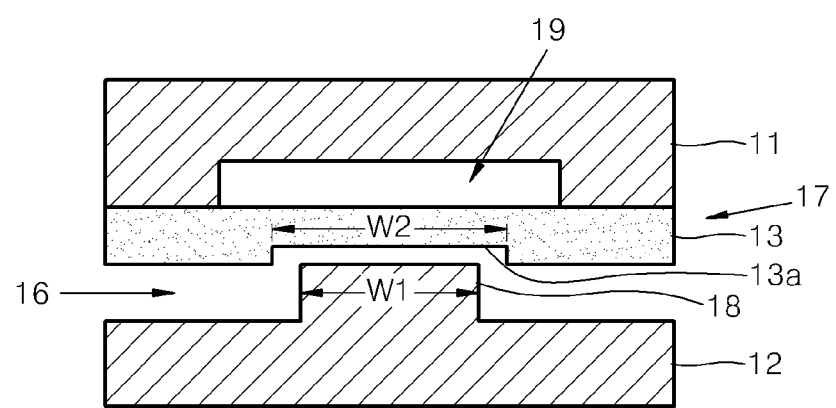
FIG. 4A is a vertical cross-sectional view taken along line A-A' of the microvalve of FIG. 3.
Figure 4B:
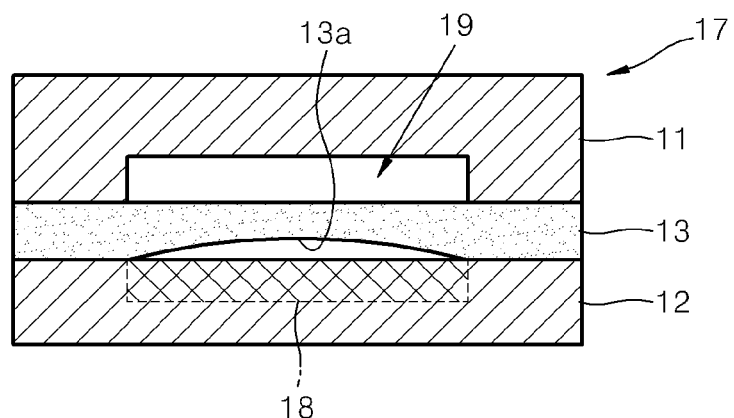
FIG. 4B is a vertical cross-sectional view taken along line B-B' of the microvalve of FIG. 3.

The configuration of the microvalve 17 shown in FIG. 3 may further be practically depicted through cross-sectional views of FIGS. 4A and 4B. FIG. 4A is a vertical cross-sectional view taken along line A-A' of the microvalve 17 of FIG. 3, and FIG. 4B is a vertical cross-sectional view taken along line B-B' of the microvalve 17 of FIG. 3.

Referring to FIG. 4A, the microfluidic channel 16 is defined in the second substrate 12. The valve seat 18 is a continuous portion of the second substrate 12, such that the second substrate 12 is a single unitary indivisible element with the valve seat 18. A distal end of the valve seat 18 is separated from the elastic film 13. Upper surfaces of a base portion of the second substrate 12 which are adjacent to the valve seat 18, face the lower surface of the elastic film 13.

The microfluidic channel 16 may be defined between side surfaces of the valve seat 18 and edges of the second substrate 12 in a direction parallel to the second substrate 12, and between the upper surfaces of the base portion of the second substrate 12 which are adjacent to the valve seat 18 and the distal end of the valve seat 18 in a direction perpendicular to the second substrate 12. That is, the second substrate 12 solely defines the microfluidic channel 16.

Alternatively, the microfluidic channel 16 may be defined by the second substrate 12 and the elastic film 13. The elastic film 13 includes a single continuous lower surface, which may include a fine pattern. The second substrate 12 includes a single continuous upper surface, which includes the upper surfaces of the base portion of the second substrate 12, side surfaces of the valve seat 18 and a distal face of the valve seat 18. The single continuous upper surface of the second substrate 12 may also define a bottom surface of the microfluidic channel 16. That is, the microfluidic channel 16 may be defined between the single continuous lower surface of the elastic film 13 and the single continuous upper surface of the second substrate 12. When the microvalve 17 is not in operation, is open and/or is closed, the microfluidic channel 16 is defined by lower surfaces of the elastic film 13 and upper surfaces of the second substrate 12 which are not in contact with each other.

The valve seat 18 protrudes from a bottom surface of the microfluidic channel 16 on the upper surface of the second substrate 12 facing the first substrate 11. The empty space 19, is on a location of the first substrate 11 corresponding to (e.g., aligned with) the valve seat 18. In one embodiment, the empty space 19 may be formed by etching a lower surface of the first substrate 11 facing the second substrate 12.

The microfluidic channel 16 on the second substrate 12 may be fluidly connected to the second holes 15b in the second substrate 12 so that a sample may flow in and out, that is, between the microfluidic channel 16 and an outside of the second substrate 12. Also, the empty space 19 in the first substrate 11 may be fluidly connected to the first holes 15a in the first substrate 11, so that air for controlling the elastic film 13 may flow in and out, that is, between the empty space 19 and an outside of the first substrate 11.

The empty space 19 and the valve seat 18 are separated from each other by the elastic film 13 between the first and second substrates 11 and 12. The elastic film 13 is attached to (e.g., contacting) the lower surface of the first substrate 11 in a region of the microvalve 17 depicted in FIG. 4A. However, in terms of the overall structure of the microfluidic device 10, as depicted in FIG. 2, the elastic film 13 may be attached to (e.g., contacting) surfaces of the first and second substrates 11 and 12 facing each other.

In one embodiment of the present invention, a predetermined fine pattern may be on a surface of the elastic film 13 facing the valve seat 18. In FIG. 4A, the fine pattern on the surface of the elastic film 13 facing the valve seat 18 may be a concave groove 13a inwardly concaved from the surface of the elastic film 13. A bottom surface and side surfaces of the concave groove 13a may be in a shape corresponding to the surface of the valve seat 18, when the concave groove 13a is viewed from a cross-section along line A-A'. The bottom surface of the concave groove 13a may be flat and the side surfaces may be extended sufficiently deep from the lower surface of the elastic film 13, to correspond to the valve seat 18. In one embodiment, for example, if a total thickness of the elastic film 13 is approximately 250 micrometers ($\mu$m) in a direction perpendicular to the second substrate 12, the concave groove 13a may have a depth in a range from about 1 $\mu$m to about 20 $\mu$m. In one embodiment, the elastic film 13 having the concave groove 13a may be formed through, for example, an injection molding.

Since the elastic film 13 includes the concave groove 13a extending inwardly from the surface of the elastic film 13, an upper surface of the valve seat 18 does not contact the elastic film 13 when the microvalve 17 is not in operation, and thus, a gap is formed between the elastic film 13 and the valve seat 18. Accordingly, although the microfluidic device 10 is not used for a prolonged period of time, the elastic film 13 may not stick to the valve seat 18. In order to make sure there is contact between the elastic film 13 and the valve seat 18 when the microvalve 17 performs a closing operation, the concave groove 13a may have a width W2 equal to or slightly greater than the width W1 of the valve seat 18, so that the valve seat 18 may enter into (e.g., be within) the concave groove 13a.

Referring to FIG. 4B, the empty space 19 described above is in the first substrate 11, and the valve seat 18 is on the second substrate 12 corresponding to the location of the empty space 19. In FIG. 4B, since the valve seat 18 is not seen separate from the second substrate 12, the valve seat 18 is indicated by dotted lines. Also referring to FIG. 4B, a cross-section along B-B' of the concave groove 13a in the elastic film 13 is depicted. When the cross-section along line B-B' is viewed, the concave groove 13a may round or semi-circular in shape.

Referring to the cross-section of FIG. 4B, the semi-circular shape includes edge portions with a curved portion between the edge portions. Both edge portions of the concave groove 13a contact ege portions of the valve seat 18. The distance between the concave groove 13a (e.g., the curved portion) and the valve seat 18 increases towards a center portion of the concave groove 13a, so as not to generate a gap between the concave groove 13a and the valve seat 18 when the microvalve 17 performs a closing operation.

Figure 5A:
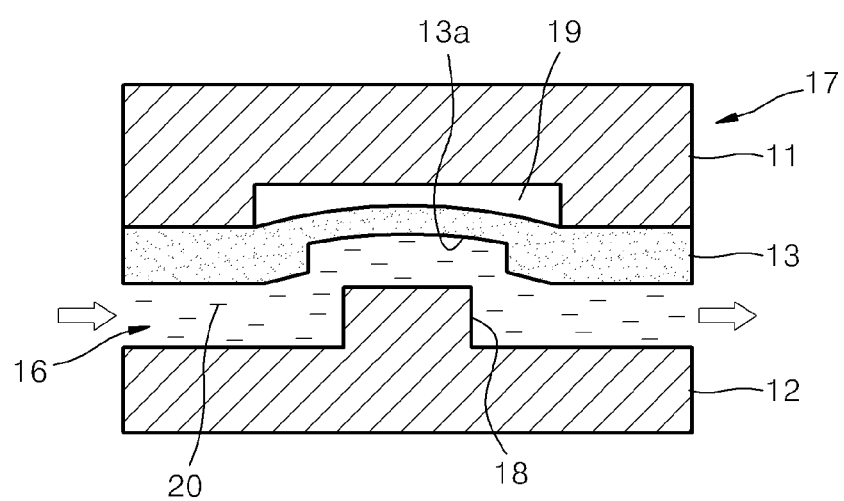
FIG. 5A is a schematic cross-sectional view showing an opening operation of the microvalve of FIG. 3.
Figure 5B:
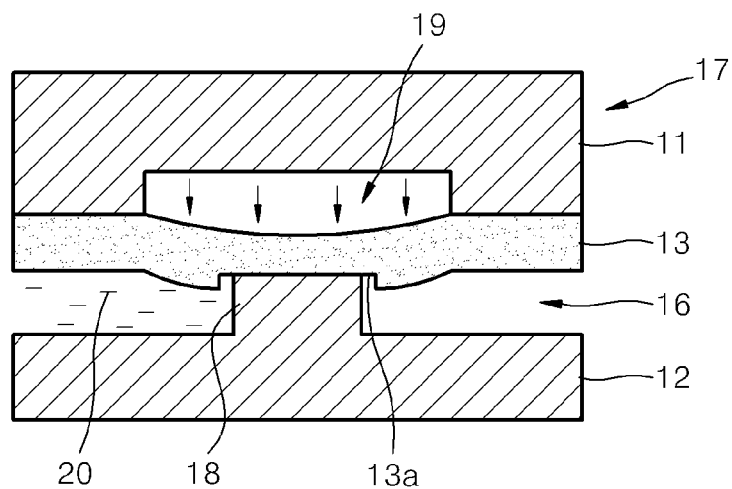
FIG. 5B and FIG. 5C are schematic cross-sectional views showing a closing operation of the microvalve of FIG. 3.
Figure 5C:
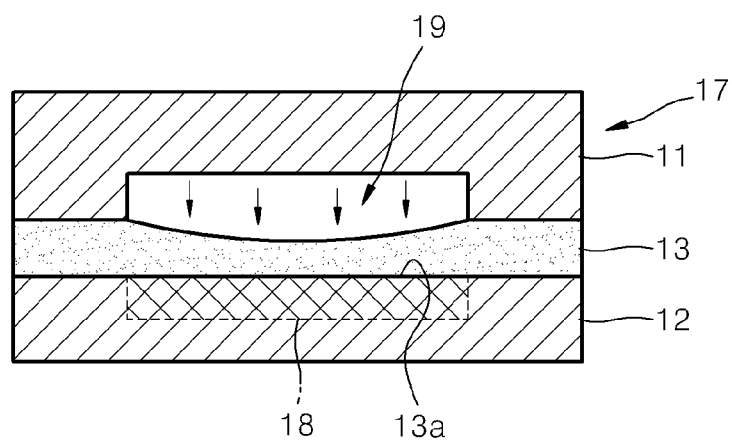

FIGS. 5A through 5C are cross-sectional views explaining the opening and closing operations of the microvalve 17 of FIGS. 3-4B. FIG. 5A is a schematic cross-sectional view taken along the same direction as FIG. 4A (line A-A' in FIG. 3) and shows an opening operation of the microvalve 17. FIG. 5B is a schematic cross-sectional view taken along the same direction as FIG. 4A and shows a closing operation of the microvalve 17. FIG. 5C is a schematic cross-sectional view taken along the same direction as FIG. 4B (line B-B' in FIG. 3) and shows a closing operation of the microvalve 17.

Referring to FIG. 5A, since the concave groove 13a is concaved inwardly from a lower surface of the elastic film 13, the upper surface of the valve seat 18 does not contact the elastic film 13 when the microvalve 17 is not in operation. In this point of view, the microvalve 17 is a normally open type microvalve when the microvalve 17 is not in operation. Accordingly, since the microvalve 17 is in an opening state when the microvalve 17 is not in operation, for example, a fluid 20 supplied to the microfluidic channel 16 through the second hole 15b may pass through the microvalve 17, as shown by the left and right arrows in FIG. 5A.

When the microvalve 17 is closed, as depicted in FIGS. 5B and 5C, a pneumatic pressure may be supplied into the empty space 19 through the first hole 15a in the first substrate 11. Then, the elastic film 13 under the empty space 19 is pushed towards the valve seat 18 due to the pneumatic pressure. When a sufficient force of pneumatic pressure indicated by the down arrows in FIGS. 5B and 5C is supplied, the elastic film 13 may tightly contact the valve seat 18 of the second substrate 12, and thus, a gap between the elastic film 13 and the valve seat 18 may be completely filled with a portion the elastic film 13.

Since the concave groove 13a in the elastic film 13 has a width slightly greater than that of the valve seat 18, the valve seat 18 may completely contact the bottom surface of the concave groove 13a. Then, the fluid 20 in the microfluidic channel 16 is blocked by the microvalve 17, and thus, may not move further through the microfluidic channel 16. The sufficient force of pneumatic pressure may be determined in consideration of various factors, for example, the material of the elastic film 13, a distance between the bottom surface of the concave groove 13a and the valve seat 18, the width and depth of the microfluidic channels 16, and/or the surface state and geometrical shape of the valve seat 18 and the elastic film 13, etc. As described with reference to FIG. 4B, in the cross-section along line B-B', the concave groove 13a may have a round or semi-circular shape. Therefore, if a sufficient force of pneumatic pressure is supplied into the empty space 19, as depicted in FIG. 5C, the bottom surface of the concave groove 13a and the valve seat 18 may tightly contact each other without a gap therebetween.

The microvalve 17 as a normally open type as described above may have various advantages. Initially, if the elastic film 13 is between the first substrate 11 and the second substrate 12 as depicted in FIG. 2, the elastic film 13 needs to be fixed on the first and second substrates 11 and 12. In this case, it is not desirable that the elastic film 13 sticks to the valve seat 18. Accordingly, in a normally closed type in which the valve seat 18 and the elastic film 13 contact each other, the surface of the valve seat 18 needs to be additionally coated so that valve seat 18 does not stick to the elastic film 13. As such, a microfluidic device having a normally closed type microvalve has a relatively complicated manufacturing process. Also, after the microfluidic device having the normally closed type microvalve is completely manufactured, in order to ensure proper separation between the valve seat 18 and the elastic film 13, a relatively large air pressure needs to be provided through the microfluidic channel 16, which may cause a gap between the first and second substrates 11 and 12 and the elastic film 13, and thus the fluid 20 may leak.

In contrast, in the disclosed microvalve 17 including the normally open type microvalve, since the valve seat 18 does not normally contact the elastic film 13 when the microvalve 17 is not in operation, the problem described above may hardly occur and the microfluidic device 10 may have a relatively simple manufacturing process.

Also, when the elastic film 13 normally contacts the valve seat 18 in the normally closed type microvalve, if the elastic film contacts the valve seat 18 for a long time, the elastic film 13 may naturally stick to a surface of the valve seat 18 due to a chemical or physical reaction therebetween. Accordingly, if the microfluidic device 10 including the normally closed type microvalve is not used for a long time, an initial operation for detaching the elastic film 13 from the valve seat 18 is needed. However, in the disclosed microfluidic device 10 including the normally open type microvalve, since the elastic film 13 does not normally contact the valve seat 18, the initial detaching operation is not needed. Accordingly, the flow of the fluid 20 in the microfluidic device 10 including the normally open type microvalve may be further efficiently and reliably controlled.

Figure 6A:
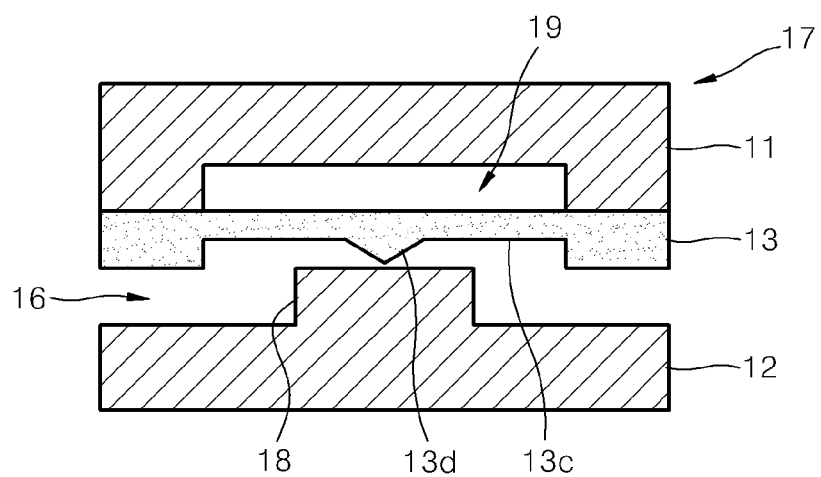
FIG. 6A is a schematic cross-sectional view showing another embodiment of a structure of a microvalve, according to the present invention.
Figure 6B:
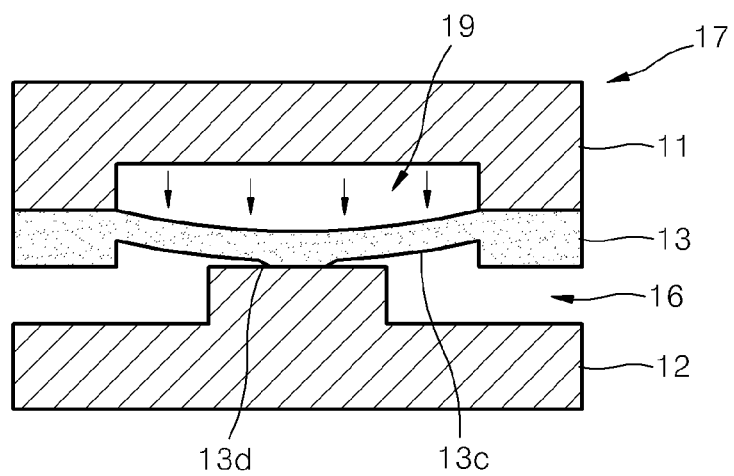
FIG. 6B is a schematic cross-sectional view showing a closing operation of the microvalve of FIG. 6A.

The fine pattern that faces the valve seat 18 on the surface of the elastic film 13 may be realized in various ways, beside the concave groove 13a described above. FIG. 6A is a schematic cross-sectional view showing another embodiment of a structure of a microvalve 17 having a elastic film 13 including a fine pattern, according to the present invention, and is a cross-sectional view taken along the same line A-A' of FIG. 4A. FIG. 6B is a schematic cross-sectional view showing a closing operation of the microvalve 17 of FIG. 6A.

Referring to FIG. 6A, the microvalve 17 includes a concave groove 13c in a surface of the elastic film 13 facing the valve seat 18, and a protrusion portion 13d extends from a bottom surface of the concave groove 13c corresponding to the valve seat 18. In the illustrated embodiment, the concave groove 13c in the elastic film 13 may have a width, for example, nearly or substantially equal to that of the empty space 19 in the first substrate 11, so that the protrusion portion 13d may be marginally in the concave groove 13c. Accordingly, the width of the concave groove 13c in FIG. 6A may be greater than that of the concave groove 13a in FIG. 4A.

The protrusion portion 13d depicted in FIG. 6A has a triangular shape cross-section having an apex. However, the shape of the cross-section of the protrusion portion 13d is not limited thereto and may be realized in various shapes. In one embodiment, for example, the protrusion portion 13d may have a round shape cross-section like a cylinder or a tetragonal shape cross-section having a flat surface. Also, the cross-section of the protrusion portion 13d may have a triangular shape as a whole while the apex portion may have a round shape or a flat shape. Although not shown, when the cross-sectional view is taken along line B-B', the protrusion portion 13d may have a round shape cross-section as in FIG. 4B.

In the case of the microvalve 17 in FIG. 6A, the apex of the protrusion portion 13d may not to directly contact an upper surface of the valve seat 18 when the microvalve 17 is not in operation. In this case, the protrusion portion 13d may have a height smaller than the depth of the concave groove 13c. Both the height and the depth are taken perpendicular to the elastic film 13 and/or the second substrate 12. In this point of view, the microvalve 17 depicted in FIG. 6A is also a normally open type microvalve, that is, in an open state when the microvalve 17 is not in operation. Since the microvalve 17 is in an open state when the microvalve 17 is not in operation, the fluid 20 supplied into the microfluidic channel 16 may pass through the microvalve 17.

Also, for example, when a pneumatic pressure is supplied into the empty space 19 of the microvalve 17 in FIG. 6A, through the first hole 15a, the elastic film 13 is pushed towards the valve seat 18 by the pneumatic pressure. Then, the apex of the protrusion portion 13d contacts the upper surface of the valve seat 18. If a sufficient force of pneumatic pressure is supplied, the protrusion portion 13d that contacts the valve seat 18 is distorted. As a result, the protrusion portion 13d may tightly contact the valve seat 18, and thus, may completely fill a gap between the protrusion portion 13d and the valve seat 18. Accordingly, the microvalve 17 is closed. When the pneumatic pressure is removed, the elastic film 13 returns to its original position by a restoration force, and the protrusion portion 13d may also be restored to its original shape.

Figure 7A:
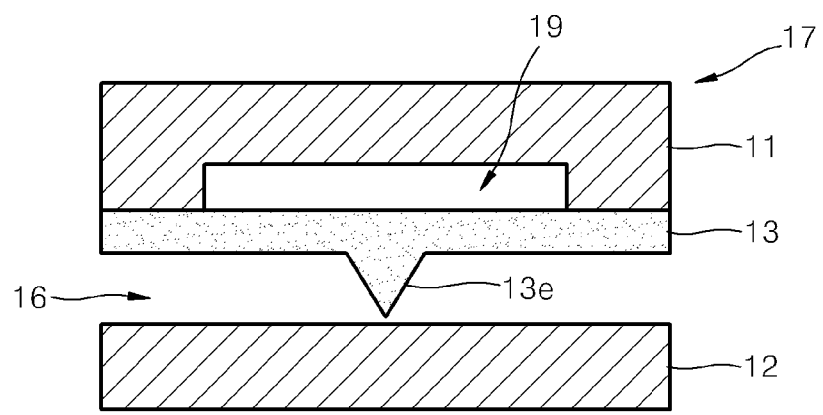
FIG. 7A is a schematic cross-sectional view showing another embodiment of a structure of a microvalve, according to the present invention.
Figure 7B:
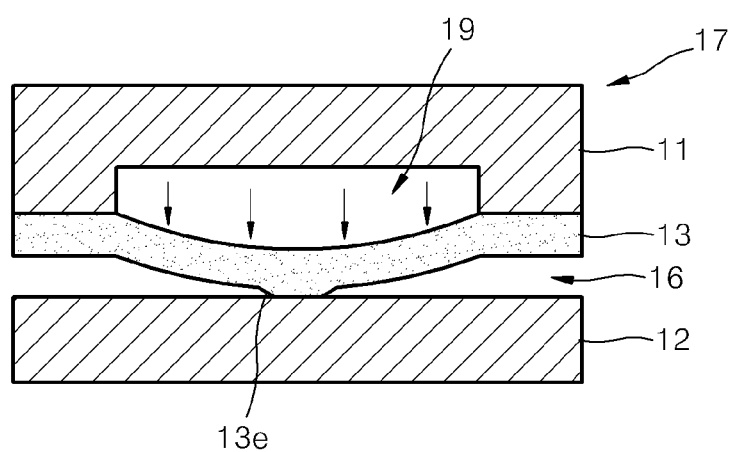
FIG. 7B is a schematic cross-sectional view showing a closing operation of the microvalve of FIG. 7A.

FIG. 7A is a schematic cross-sectional view of another embodiment of a structure of a microvalve 17 having the elastic film 13 including a fine pattern, according to the present invention, and is a view taken along line A-A' as in FIG. 4A. FIG. 7B is a schematic cross-sectional view showing a closing operation of the microvalve 17 of FIG. 7A.

Referring to FIG. 7A, the microvalve 17 includes a protrusion portion 13e as a fine pattern directly on a surface of the elastic film 13 facing the second substrate 12. In the illustrated embodiment, the elastic film 13 does not have a concave groove, and the protrusion portion 13e may be directly protruding from the lower surface of the elastic film 13. That is, the portion of the lower surface of the elastic film 13 excluding the protrusion portion 13e, is continuously coplanar. Also, a valve seat is not included in the microfluidic channel 16 of the second substrate 12. Therefore, the protrusion portion 13e may also perform the same function as a valve seat of the microvalve 17.

To accomplish this, the protrusion portion 13e may extend towards a bottom surface of the microfluidic channel 16 from the surface of the elastic film 13, such that a distal end of the protrusion portion 13e is closer to the upper surface of the second substrate 12 than the lower surface of the elastic film 13. In FIG. 7A, the protrusion portion 13e has a triangular shape cross-section having an apex at the distal end, but the cross-sectional shape of the protrusion portion 13e is not limited thereto. In one embodiment, for example, as described above, the protrusion portion 13e may have a round shape cross-section like a cylinder or a tetragonal shape cross-section having a flat surface. Also, the cross-section of the protrusion portion 13e may have a triangular shape as a whole while the apex portion may have a round shape or a flat shape.

In the microvalve 17 depicted in FIG. 7A, the protrusion portion 13e includes the apex which may not directly contact the bottom surface of the microfluidic channel 16 (e.g., the upper surface of the second substrate 12) when the microvalve 17 is not in operation, and thus, may have a gap between the bottom surface of the microfluidic channel 16 and the protrusion portion 13e. In this case, the protrusion portion 13e may have a height smaller than the width (that is, the distance between the bottom surface of the elastic film 13 and the upper surface of the second substrate 12) of the microfluidic channel 16. In this regards, the microvalve 17 depicted in FIG. 7A is also a normally open type microvalve when the microvalve 17 is not in operation.

Since the microvalve 17 of FIG. 7A is in an open state when the microvalve 17 is not in operation, the fluid 20 supplied into the microfluidic channel 16 may pass through the microvalve 17. Also, when a pneumatic pressure is supplied into the empty space 19, the elastic film 13 is pushed towards the bottom surface of the microfluidic channel 16 by the pneumatic pressure. Then, the apex of the protrusion portion 13e contacts the bottom surface of the microfluidic channel 16. If a sufficient force of pneumatic pressure is supplied, the protrusion portion 13e that contacts the bottom surface of the microfluidic channel 16 is distorted. As a result, the protrusion portion 13e may tightly contact the bottom surface of the microfluidic channel 16, and thus, may completely fill a gap between the protrusion portion 13e and the second substrate 12. Accordingly, the microvalve 17 is closed. Afterwards, when the pneumatic pressure is removed, the elastic film 13 returns to its original position by a restoration force and the protrusion portion 13e may also be restored to its original shape.

Figure 8:
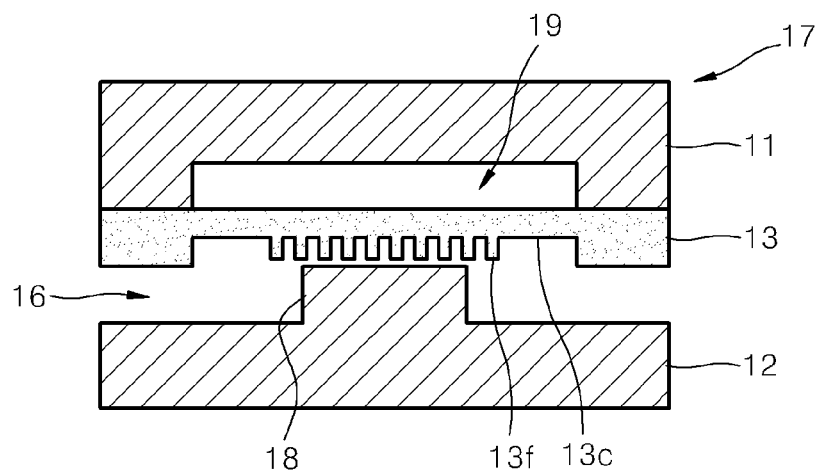
FIG. 8 is a cross-sectional view of another embodiment of a structure of a microvalve, according to the present invention.

FIG. 8 is a schematic cross-sectional view of another embodiment of a structure of a microvalve 17 having the elastic film 13 including a fine pattern, according to the present invention, the view taken along line A-A' as in FIG. 4A. Referring to FIG. 8, a concave groove 13c in a surface of the elastic film 13 facing a valve seat 18, and an embossed fine lattice pattern 13f protrudes from a bottom surface of the concave groove 13c corresponding to the location of valve seat 18. As in FIG. 6A, the concave groove 13c in the elastic film 13 may have a width, for example, almost or substantially equal to that of the empty space 19 in the first substrate 11 so that the fine lattice pattern 13f may be marginally within the concave groove 13c.

The fine lattice pattern 13f in the concave groove 13c may have, for example, an array structure in which a plurality of parallel straight bars protrude from the bottom surface of the concave groove 13c. Also, the fine lattice pattern 13f may have an embossed mesh structure. As in the previous embodiment, the fine lattice pattern 13f (e.g., a distal end) may not directly contact an upper surface of the valve seat 18 when the microvalve 17 is not in operation. In this case, the fine lattice pattern 13f may have a height smaller than the depth of the concave groove 13c.

Figure 9:
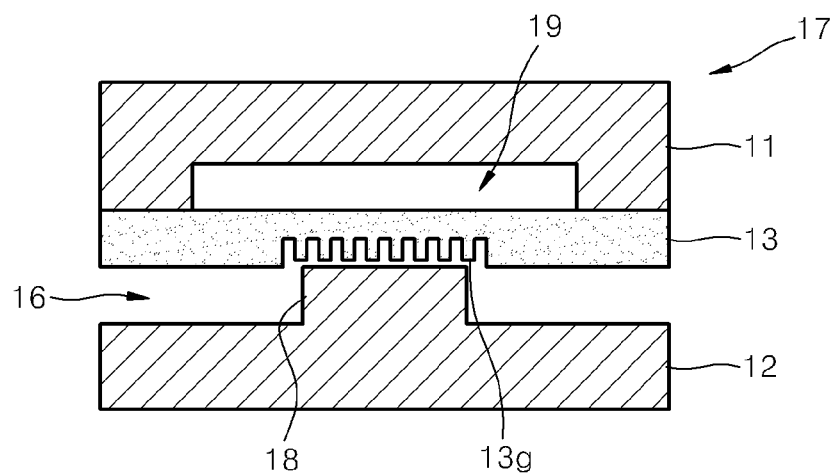
FIG. 9 is a cross-sectional view of another embodiment of a structure of a microvalve, according to the present invention.

Finally, FIG. 9 is a schematic cross-sectional view of another embodiment of a structure of a microvalve 17 having the elastic film 13 including a fine pattern, according to the present invention, the view taken along line A-A' as in FIG. 4A. Referring to FIG. 9, an engraved fine lattice pattern 13g is on a surface of the elastic film 13 facing and corresponding to the location of the valve seat 18.

In the illustrated embodiment, the elastic film 13 does not include a concave groove, and the fine lattice pattern 13g is directly in the lower surface of the elastic film 13. That is, portions of the lower surface of the elastic film 13 adjacent to the fine lattice pattern 13g are coplanar. The fine lattice pattern 13g may have, for example, an array structure in which a plurality of parallel straight bars are engraved in the surface of the elastic film 13. The straight bars are alternated with recesses within the fine lattice pattern 13g in FIG. 9. Also, the fine lattice pattern 13g may have an engraved mesh structure.

As in the previous embodiments, the fine lattice pattern 13g (e.g., distal ends of the bars) may not directly contact an upper surface of the valve seat 18 when the microvalve 17 is not in operation. In this case, the fine lattice pattern 13g (e.g., the straight bars) may have a height smaller than a thickness of the elastic film 13. Both the height and the thickness are taken perpendicular to the elastic film 13 and/or the second substrate 12. Then, the microvalve 17 according to the illustrated embodiment may be a normally open type microvalve.

While a microfluidic device having a microvalve has been particularly shown and described with reference to embodiments and accompanying drawings thereof, it should not be construed as being limited to the embodiments set forth herein but as an exemplary since various changes in form and details may be made without departing from the spirit and scope of the present invention.

What is claimed is:

1. A microfluidic device comprising:
a first substrate;
a second substrate which faces the first substrate;
an elastic film between the first and second substrates;
a microfluidic channel on the second substrate;
a valve seat protruding into the microfluidic channel of the second substrate;
a cavity on a surface of the first substrate facing the second substrate, and overlapping the valve seat; and
a fine pattern on a surface of the elastic film facing the valve seat, and overlapping the valve seat, wherein the fine pattern comprises a concave groove extending away from the surface of the elastic film facing the valve seat, and the concave groove includes a bottom surface separated from the surface of the elastic film facing the valve seat, the bottom surface having a shape corresponding to a surface shape of the valve seat when the bottom surface of the concave groove is viewed in a first cross-sectional direction;
wherein the elastic film and valve seat are configured such that contact between the fine pattern of the elastic film and the upper surface of the valve seat can block the flow of a fluid through the microfluidic channel.

2. The microfluidic device of claim 1, wherein,
when a pneumatic pressure is supplied through the cavity, an upper surface of the valve seat and the fine pattern of the elastic film contact each other, and
when the pneumatic pressure is not supplied through the cavity, there is a gap between the upper surface of the valve seat and the fine pattern of the elastic film.

3. The microfluidic device of claim 1, wherein the bottom surface of the concave groove has a flat shape when the bottom surface of the concave groove is viewed in the first cross-sectional direction.

4. The microfluidic device of claim 1, wherein the concave groove has a width greater than a width of the valve seat in a first cross-section direction, the widths taken parallel to the second substrate.

5. The microfluidic device of claim 4, wherein the concave groove includes end portions which contact end portions of the valve seat, and a distance between the concave groove and the valve seat increases towards a center of the concave groove, when the concave groove is viewed in a second cross-sectional direction perpendicular to the first cross-sectional direction.

6. The microfluidic device of claim 5, wherein the concave groove has a concave semi-circular shape, when the concave groove is viewed in the second cross-sectional direction.

7. The microfluidic device of claim 1, wherein the fine pattern of the elastic film further comprises:

a protrusion portion extending from the bottom surface of the concave groove and overlapping the valve seat.

8. The microfluidic device of claim 7, wherein the concave groove has a width substantially equal to a width of the cavity in the first substrate, the widths taken parallel to the second substrate.

9. The microfluidic device of claim 7, wherein the protrusion portion of the fine pattern has a triangular cross-sectional shape.

10. The microfluidic device of claim 7, wherein the protrusion portion of the fine pattern has a height less than a depth of the concave groove, the height and the depth taken perpendicular to the second substrate.

11. The microfluidic device of claim 1, wherein the fine pattern of the elastic film further comprises:
an embossed fine lattice pattern protruding from the bottom surface of the concave groove and overlapping the valve seat.

12. The microfluidic device of claim 11, wherein the concave groove has a width substantially equal to a width of the cavity in the first substrate, the widths taken parallel to the second substrate.

13. The microfluidic device of claim 11, wherein the fine lattice pattern of the fine pattern has an array structure including a plurality of parallel bars protruding from the bottom surface of the concave groove, or has a mesh structure.

14. The microfluidic device of claim 11, wherein the fine lattice pattern has a height less than a depth of the concave groove, the height and the depth taken perpendicular to the second substrate.

15. A microfluidic device comprising:
a first substrate,
a second substrate which faces the first substrate;
an elastic film between the first and second substrates;
a microfluidic channel on the second substrate;
a valve seat protruding into the microfluidic channel of the second substrate;
a cavity on a surface of the first substrate facing the second substrate, and overlapping the valve seat; and
a fine pattern on a surface of the elastic film facing the valve seat, and overlapping the valve seat;
wherein the elastic film and valve seat are configured such that contact between the fine pattern of the elastic film and the upper surface of the valve seat can block the flow of a fluid through the microfluidic channel, and
wherein the fine pattern of the elastic film comprises a fine lattice pattern directly in the surface of the elastic film facing and overlapping the valve seat.

16. The microfluidic device of claim 15, wherein the fine lattice pattern has an array structure including a plurality of recesses extended from the surface of the elastic film alternating with bars of the first substrate, or has a mesh structure.

17. A microfluidic device comprising:
a first substrate;
a second substrate which faces the first substrate;
an elastic film between the first and second substrates;
a microfluidic channel on the second substrate;
a valve seat protruding into the microfluidic channel of the second substrate;
a cavity on a surface of the first substrate facing the second substrate, and overlapping the valve seat; and
a fine pattern on a surface of the elastic film facing the valve seat, and overlapping the valve seat;
wherein the elastic film and valve seat are configured such that contact between the fine pattern of the elastic film and the upper surface of the valve seat can block the flow of a fluid through the microfluidic channel, and
wherein the fine pattern of the elastic film comprises a protruding portion extending directly from the surface of the elastic film facing, and overlapping the valve seat.

18. The microfluidic device of claim 17, wherein a distal end of the protruding portion is closer to the valve seat than the surface of the elastic film facing the valve seat.

19. A microfluidic device comprising:
a first substrate,
a second substrate which faces the first substrate;
an elastic film between the first and second substrates;
a microfluidic channel on a surface of the second substrate facing the first substrate;
a fine pattern protruding from a surface of the elastic film towards a bottom surface of the microfluidic channel; and
a cavity on a surface of the first substrate facing the second substrate, and overlapping the fine pattern;
wherein the elastic film and bottom surface of the microfluidic channel are configured such that contact between the fine pattern of the elastic film and the bottom surface of the microfluidic channel can block the flow of a fluid through the microfluidic channel, and
wherein the fine pattern of the elastic film comprises a protrusion portion having a triangular cross-sectional shape protruding from the surface of the elastic film.

20. The microfluidic device of claim 19, wherein
when a pneumatic pressure is supplied through the cavity, the bottom surface of the microfluidic channel contacts the fine pattern of the elastic film, and
when the pneumatic pressure is not supplied through the cavity, there is a gap between the bottom surface of the microfluidic channel and the fine pattern of the elastic film.

21. The microfluidic device of claim 19, wherein the fine pattern of the elastic film has a height less than a depth of the microfluidic channel, the height and the depth taken perpendicular to the second substrate.

22. The microfluidic device of claim 21, wherein the microfluidic channel has a height substantially equal to a distance between the surface of the elastic film from which the fine pattern protrudes and the surface of the second substrate.

* * * * *